United States Patent
Finkenrath et al.

(10) Patent No.: US 7,739,864 B2
(45) Date of Patent: *Jun. 22, 2010

(54) SYSTEMS AND METHODS FOR POWER GENERATION WITH CARBON DIOXIDE ISOLATION

(75) Inventors: Matthias Finkenrath, Bavaria (DE); Michael Bartlett, Bavaria (DE)

(73) Assignee: General Electric Company, Niskayuna, NY (US)

( * ) Notice: Subject to any disclaimer, the term of this patent is extended or adjusted under 35 U.S.C. 154(b) by 897 days.

This patent is subject to a terminal disclaimer.

(21) Appl. No.: 11/557,250

(22) Filed: Nov. 7, 2006

(65) Prior Publication Data
US 2008/0104938 A1 May 8, 2008

(51) Int. Cl.
*F02C 7/08* (2006.01)
*F02G 1/00* (2006.01)
*F02G 3/00* (2006.01)

(52) U.S. Cl. ............ 60/39.52; 60/39.17; 60/791

(58) Field of Classification Search ............ 60/772, 60/39.52, 791, 39.17
See application file for complete search history.

(56) References Cited

U.S. PATENT DOCUMENTS

| | | | | |
|---|---|---|---|---|
| 2,915,379 | A * | 12/1959 | Agarwal | 75/444 |
| 4,285,917 | A * | 8/1981 | Knight | 423/224 |
| 4,528,811 | A * | 7/1985 | Stahl | 60/784 |
| 4,843,517 | A | 6/1989 | Maruyama et al. | |
| 5,490,035 | A | 2/1996 | Yen et al. | |
| 5,724,805 | A * | 3/1998 | Golomb et al. | 60/783 |
| 5,832,712 | A | 11/1998 | Ronning et al. | |
| 6,184,324 | B1 | 2/2001 | Benz et al. | |
| 6,655,150 | B1 | 12/2003 | Asen et al. | |
| 6,832,485 | B2 * | 12/2004 | Sugarmen et al. | 60/780 |
| 6,910,335 | B2 * | 6/2005 | Viteri et al. | 60/786 |
| 6,957,539 | B2 * | 10/2005 | Lebas et al. | 60/772 |

(Continued)

FOREIGN PATENT DOCUMENTS

WO 2004072443 A1 8/2004

OTHER PUBLICATIONS

O. Bolland & S. Saether, "New Concepts for Natural Gas Fired Power Plants Which Simplify the Recovery of Carbon Dioxide"; Energy Convers. Mgmt vol. 33, No. 5-8, pp. 467-475, 1992.

(Continued)

*Primary Examiner*—William H Rodríguez
(74) *Attorney, Agent, or Firm*—Patrick K. Patnode

(57) ABSTRACT

A power generation system includes first and second turbines. The first turbine including a low-pressure compressor (14) and a high-pressure compressor (16). A combustion chamber (22) combusts compressed oxidant and a fuel stream to generate a hot flue gas (31). The first turbine further includes a high-pressure expander (20) for receiving the flue gas and generating a $CO_2$ rich exhaust gas. A low-pressure expander (22) generates a first final exhaust (52) and electrical energy. A $CO_2$ separation system receives exhaust gas (38) and provides a $CO_2$ lean gas fed to low-pressure expander (22). The second turbine including a compressor section (64) configured to discharge a recycle stream (71) from a high pressure compressor (70) to a second combustion chamber (72) and supply a split stream (84) from a low-pressure compressor (68) to high pressure compressor (16) of the first turbine.

22 Claims, 4 Drawing Sheets

U.S. PATENT DOCUMENTS

| | | | |
|---|---|---|---|
| 7,266,940 | B2* | 9/2007 | Balan et al. ............... 60/39.181 |
| 2002/0043063 | A1 | 4/2002 | Kataoka et al. |
| 2004/0011057 | A1 | 1/2004 | Huber |
| 2004/0016237 | A1 | 1/2004 | Marin et al. |
| 2004/0134197 | A1* | 7/2004 | Marin et al. .................. 60/774 |
| 2004/0170935 | A1 | 9/2004 | Lebas et al. |
| 2005/0028529 | A1 | 2/2005 | Bartlett et al. |
| 2005/0132713 | A1 | 6/2005 | Neary |
| 2006/0037337 | A1 | 2/2006 | Lear, Jr. et al. |
| 2006/0064985 | A1* | 3/2006 | Buecker et al. ............... 60/772 |
| 2006/0112696 | A1* | 6/2006 | Lynghjem et al. ............. 60/772 |
| 2007/0199300 | A1* | 8/2007 | MacAdam et al. ......... 60/39.52 |
| 2008/0104939 | A1* | 5/2008 | Hoffmann et al. ............ 60/39.5 |

OTHER PUBLICATIONS

Thormod Anderson, Hanne M. Kvamsdal and Olav Bolland, "Gas Turbine Combined Cycle With CO2-Capture Using Auto-Thermal Reforming of Natural Gas"; Proceedings of ASME TURBO EXPO 2000: Land, Sea, and Air; May 8-11, 2000, Munich, Germany; 2000-GT-162. pp. 1-8.

Olav Bollard, et al.; "Exergy Analysis of Gas-Turbine Combined Cycle with CO2 Capture Using Auto-Thermal Reforming of Natural Gas"; Available from http://www.tev.ntnu.no/GlobalWatch/co2/Bolland_Ertesvaag_Speich,%20AIM%20Liege.pdf; (pp. 6).

Hanne M. Kvamsdal, Ivar S. Ertesvag, Olav Bolland, & Tor Tolstad, "Exergy Analysis of Gas-Turbine Combined Cycle With CO2 Capture Using Pre-Combustion Decarbonization of Natural Gas"; Proceedings of ASME Turbo Expo 2002: Land, Sea, and Air, Jun. 3-6, 2002, Amsterdam, The Netherlands; GT-2002-30411, pp. 1-8.

Olav Bolland, Henriette Undrum; "A Novel Methodology for Comparing CO2 Capture Options for Natural Gas-Fired Combined Cycle Plants"; Advances in Environmental Research 7 (2003) pp. 901-911.

Riti Singh, John Horlock & Tony Haslam; "Cycles for Low Carbon Dioxide Production"; Conference Report and Summary; (pp. 6).

* cited by examiner

SYSTEMS AND METHODS FOR POWER GENERATION WITH CARBON DIOXIDE ISOLATION

BACKGROUND

The invention relates generally to power generation and the efficient recovery of carbon dioxide. More particularly, the invention relates to the integration of gas-turbine exhaust compression and recirculation with carbon dioxide separation and recovery.

Power generation systems that combust fuels containing carbon, for example, fossil fuels, produce carbon dioxide ($CO_2$) as a byproduct during combustion as carbon is converted to $CO_2$. Carbon dioxide ($CO_2$) emissions from power plants utilizing fossil fuels are increasingly penalized by national and international regulations, such as the Kyoto protocol, and the EU Emission Trading Scheme. With increasing cost of emitting $CO_2$, $CO_2$ emission reduction is important for economic power generation. Removal or recovery of the carbon dioxide ($CO_2$) from power generation systems, such as from the exhaust of a gas turbine, is generally not economical due to the low $CO_2$ content and low (ambient) pressure of the exhaust. Therefore, the exhaust containing the $CO_2$ is typically released to the atmosphere, and does not get sequestered into oceans, mines, oil wells, geological saline reservoirs, and so on.

Gas turbine plants operate on the Brayton cycle. They use a compressor to compress the inlet air upstream of a combustion chamber. Then the fuel is introduced and ignited to produce a high temperature, high-pressure gas that enters and expands through the turbine section. The turbine section powers both the generator and compressor. Combustion turbines are also able to burn a wide range of liquid and gaseous fuels from crude oil to natural gas.

There are three generally recognized ways currently employed for reducing $CO_2$ emissions from such power stations. The first method is to capture $CO_2$ after combustion with air from the exhaust gas, wherein the $CO_2$ produced during the combustion is removed from the exhaust gases by an absorption process, membranes, diaphragms, cryogenic processes or combinations thereof. This method, commonly referred to as post-combustion capture, usually focuses on reducing $CO_2$ emissions from the atmospheric exhaust gas of a power station. A second method includes reducing the carbon content of the fuel. In this method, the fuel is first converted into $H_2$ and $CO_2$ prior to combustion. Thus, it becomes possible to capture the carbon content of the fuel before entry into the gas turbine. A third method includes an oxy-fuel process. In this method, pure oxygen is used as the oxidant as opposed to air, thereby resulting in a flue gas consisting of carbon dioxide and water.

The main disadvantage of the post-combustion $CO_2$ capture processes is that the $CO_2$ partial pressure is very low on account of the low $CO_2$ concentration in the flue gas (typically 3-4% by volume for natural gas fired power plants) and therefore large and expensive devices are needed for removing the $CO_2$. Although the $CO_2$ concentration at the stack and thus the partial pressure could be increased by partial recirculation of the flue gas to the compressor of the gas turbine it still remains fairly low (about 6-10% by volume). The low $CO_2$ partial pressures and large gas volumes implicit with the form of post-combustion capture leads to very high energy costs related to $CO_2$ removal in addition to very bulky and costly equipment. Both these factors significantly increase the cost of electricity generation. Therefore there is a need for a technique that provides for economical recovery of $CO_2$ discharged from power generation systems (for example, gas turbines) that rely on carbon-containing fuels.

BRIEF DESCRIPTION

In one aspect, a power generation system includes a first turbine system. The first turbine system includes a first compressor section comprising at least two stages. The two stages includes a first low pressure compressor fluidly coupled to a first high pressure compressor configured to supply a first portion of compressed oxidant and a second portion of compressed oxidant A first combustion chamber is configured to combust said first portion of compressed oxidant and a first fuel stream comprising carbon-based fuels and to generate a first hot flue gas. The first turbine system further includes a first expander section having an inlet for receiving said first hot flue gas and generating a first expanded exhaust gas rich in $CO_2$. The first high pressure expander is fluidly coupled to a first low pressure expander configured to generate a first exhaust and electrical energy. A $CO_2$ separation system is fluidly coupled to the high pressure expander for receiving said first expanded exhaust gas from said first high pressure expander and provide a $CO_2$ lean gas that is then fed to said first low-pressure expander. The power generation system also includes a second turbine system including a second compressor section comprising at least two stages. The two stages includes a second low pressure compressor fluidly coupled to a second high pressure compressor, wherein said high pressure compressor is configured to receive said second portion of compressed oxidant. A second combustion chamber is configured to combust a second fuel stream comprising carbon-based fuels and to generate a second hot flue gas and a second expander section is configured to receive said second hot flue gas and to generate a second final exhaust and electrical energy. The second compressor section is configured to receive said second final exhaust comprising carbon dioxide and to discharge a recycle stream from said second high pressure compressor to said second combustion chamber and a split stream from said second low pressure compressor to said first high pressure compressor.

In another aspect a power generation system comprising a first turbine system. The first turbine system includes a first compressor section comprising at least two stages. The two stages comprises a first low pressure compressor fluidly coupled to a first high pressure compressor, the first low pressure compressor configured to supply a first portion of compressed oxidant and the high pressure compressor is configured to supply a first compressed mixed stream. A first combustion chamber is configured to combust a first fuel stream comprising carbon-based fuels and the first compressed mixed stream and to generate a first hot flue gas. The first turbine system further includes a first expander section having an inlet for receiving the first hot flue gas comprising at least two stages. The two stages includes a first high pressure expander, which first high pressure expander is fluidly coupled to a first low pressure expander configured to generate a first final exhaust and electrical energy. The power generation system also includes a second turbine system with a second compressor section comprising at least two stages. The two stages includes a second low pressure compressor fluidly coupled to a second high pressure compressor, wherein the low pressure compressor is configured to generate a split stream and the high pressure compressor is configured to generate a second mixed stream. A second combustion chamber is configured to combust the second mixed stream and a second fuel stream comprising carbon-based fuels and to generate a second hot flue gas. A second expander section is configured to receive the second hot flue gas and to generate a second final exhaust and electrical energy. The power generation system also includes a $CO_2$ separation system fluidly coupled to the first and second compressor sections. The $CO_2$ separation system is configured to receive the split stream and generate a $CO_2$ lean stream. The second compressor section is configured to receive the second final exhaust comprising carbon dioxide and to discharge the second mixed stream from the high-pressure compressor to the second combustion chamber.

In yet another aspect, a method for generating power includes compressing an oxidant in a compressor section to produce a first portion and a second portion of compressed oxidant and combusting a first fuel and the first portion of compressed oxidant to produce a hot flue gas. The method also includes expanding the hot flue gas in an expander section and generating electrical energy wherein the expander section is configured to receive the hot flue gas comprising at least two stages. The two stages includes a high-pressure expander configured to generate a first expanded exhaust gas rich in $CO_2$. The high-pressure expander fluidly coupled to a low pressure expander configured to generate a first final exhaust and electrical energy. The method further includes separating $CO_2$ from the first expanded exhaust gas in a $CO_2$ separator and introducing a $CO_2$ lean gas to the low pressure expander and compressing the second portion of compressed oxidant in a compressor section. The compressor section includes at least two stages. The two stages includes a second low pressure compressor fluidly coupled to a second high pressure compressor, wherein the high pressure compressor is configured to receive the second portion of compressed oxidant. The method also includes combusting a second fuel stream and a recycle stream comprising carbon-based fuels and generating a second hot flue gas; and expanding the second hot flue gas and to generate a second final exhaust and electrical energy. The second compressor section is configured to receive the second final exhaust comprising carbon dioxide and to discharge the recycle stream from the second high pressure compressor and a split stream from the second low pressure compressor to the first high pressure compressor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present disclosure provides a process for lowering $CO_2$ emissions by separation of $CO_2$ at high pressures in a power plant that utilizes gas turbines for power generation. $CO_2$ is removed from the $CO_2$-rich flue gases mid-way through the expansion pathway or the compression pathway of a gas turbine. As the concentration and partial pressure of $CO_2$ is increased, a lower energy penalty is observed to remove the $CO_2$.

One embodiment of the present invention provides for two or more exemplary gas turbine systems operating in a power generation system, which turbine systems are inter-linked midway through the compression pathways and share a common supply of compressed oxidant. As a result, the linking of the gas turbines leads to an increase in the $CO_2$ concentration within the process, which is beneficial for the $CO_2$ separation process. In one example, a compressor in a first turbine system supplies oxidant (via conduits) to a combustion chamber in the first turbine system and also to a combustion chamber in a second turbine system. As discussed below, this can be employed to increase the concentration of $CO_2$ in the recycle stream in the second turbine system from the exhaust of one or more of the gas turbines. The recovered $CO_2$ may be sold as product, used for enhanced oil recovery, or consumed on-site as feed in other processes, for example. Further, such recovery of $CO_2$ reduces the amount of $CO_2$ emitted to the environment from the power generation system.

Figure 1:
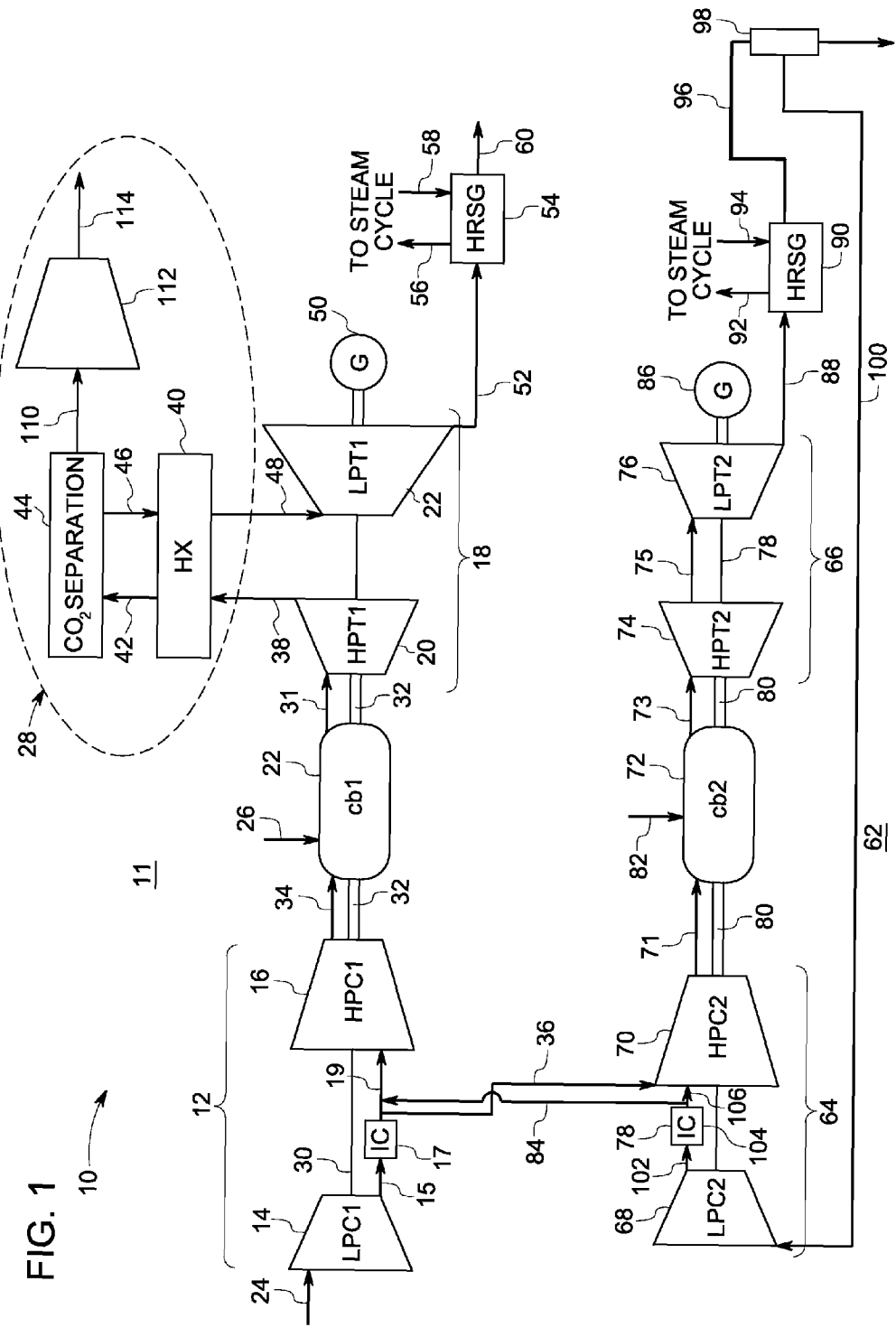
FIG. 1 is a schematic illustration of an exemplary power generation system comprising two turbine systems in accordance with certain embodiments of the present invention.

Referring now to FIG. 1, there is illustrated an exemplary power generation system 10 with a gas turbine system 11. The gas turbine system 11 generally includes a first compressor section 12 that typically includes at least two stages. In the exemplary embodiment, as shown in FIG. 1, the first compressor section 12 includes a first low-pressure compressor 14 fluidly coupled to a first high-pressure compressor 16 configured to supply a first portion of compressed oxidant 34 and a second portion of compressed oxidant 36. The first turbine system 11 also includes a first combustion chamber 22, a first expander section 18 for supplying the energy required for driving the compressors 14 and 16 and a generator 50. The first combustion chamber 22 is configured to combust the first portion of compressed oxidant 34 and a first fuel stream 26 comprising carbon-based fuels and to generate a first hot flue gas 31.

The first expander section 18 has an inlet for receiving the first hot flue gas 31 and is configured to have at least two stages. The two stages include a first high-pressure expander 20 configured to generate a first expanded exhaust gas 38 rich in $CO_2$. The first high-pressure expander 20 is fluidly coupled to a first low-pressure expander 22 configured to generate a first final exhaust 52 and electrical energy.

The first turbine system 11 further includes a $CO_2$ separation system 28 fluidly coupled to the first high-pressure expander 20 for receiving the first expanded exhaust gas 38 from the first high pressure expander 20 and to provide a $CO_2$ lean gas 48 to the first low-pressure expander 22.

The power generation system 10 also includes a second turbine system 62 comprising a second compressor section 64 configured to have at least two stages. The two stages include a second low-pressure compressor 68 fluidly coupled to a second high-pressure compressor 70. The second high-pressure compressor 70 is configured to receive the second portion of compressed oxidant 36 and generate a recycle stream 71. A second combustion chamber 72 is configured to combust a second fuel stream 82 and the recycle stream 71 comprising carbon-based fuels and to generate a second hot flue gas 73.

A second expander section 66 is configured to receive the second hot flue gas 73. The second expander section 66 typically has at least two stages including a second high pressure expander 74 configured to generate a second expanded exhaust gas 75. The second high-pressure expander 74 is fluidly coupled to a second low-pressure expander 76 configured to generate a second final exhaust 88 and electrical energy through a generator 86. In some embodiments, the second expander section 66 comprises a single stage.

The second compressor section 64 is configured to receive the second final exhaust 88 comprising carbon dioxide and to provide the recycle stream 71 from the high-pressure compressor 70 to the second combustion chamber 72 and a split stream 84 from the low-pressure compressor 68 to the inlet of the first high-pressure compressor.

As shown in the embodiment of FIG. 1, the $CO_2$ separation system 28 advantageously includes a heat exchanger 40 and a $CO_2$ separator 44. The $CO_2$ separator 44 may apply various techniques known in the art, including but not limited to pressure swing adsorption, chemical absorption and membrane separation, and so forth. To separate the $CO_2$ from the first expanded exhaust stream 38, the first expanded exhaust 38 is introduced into the heat exchanger 40 to reduce the temperature and produce a cooled first expanded exhaust 42. The cooled first expanded exhaust 42 is introduced into the $CO_2$ separator 44 to generate a $CO_2$ rich stream 110 and a $CO_2$ lean stream 46. The $CO_2$ lean stream 46 further comprises CO, $N_2$ and un-reacted fuel. The $CO_2$ lean stream 46 is introduced into the heat exchanger 40 to recover the heat content of or from the first expanded exhaust 38 and generate a heated $CO_2$ lean stream 48. The $CO_2$ lean stream 48 is introduced into the low-pressure expander 22 for further expansion and generation of electrical energy.

Pressure swing adsorption (PSA) may be used for separation of carbon dioxide from a mixture of gases. In PSA techniques, at a high partial pressure, solid molecular sieves can adsorb carbon dioxide more strongly than other gases. As a result, at elevated pressures, carbon dioxide is removed from the mixture of gases this mixture is passed through an adsorption bed. Regeneration of the bed is accomplished by depressurization and purging. Typically for critical operations, a plurality of adsorption vessels is used for continuous separation of carbon dioxide, wherein one adsorption bed is used while the others are regenerated.

Membrane separation technology may also be used for separation of carbon dioxide from a gas stream. Membrane processes are generally more energy efficient and easier to operate than absorption processes. The membranes used for high temperature carbon dioxide separation include zeolite and ceramic membranes that are selective to $CO_2$. Typically membrane separators work more efficiently at higher pressures, and use of a membrane separator to separate the carbon dioxide from the cooled first exhaust stream 38 is facilitated by the elevated pressure at the outlet of the high pressure expander. The higher pressure available for the separation of $CO_2$ also reduces the size of the $CO_2$ separator 44, thereby enhancing the feasibility and the economics of the $CO_2$ separation process. The overall efficiency of power generation and the $CO_2$ separation is further enhanced while using high temperature membranes to separate $CO_2$.

Yet another technique used for separation of $CO_2$ from the first expanded exhaust 38 may include, but is not limited to, chemical absorption of $CO_2$ using amines. The first expanded exhaust 38 may be cooled to a suitable temperature to use chemical absorption of carbon dioxide using amines. This technique is based on alkanol amines or other solvents that have the ability to absorb carbon dioxide at relatively low temperatures, and are easily regenerated by raising the temperature of the rich solvents. A carbon dioxide rich stream 110 is obtained after regeneration of the rich solvent. The solvents used in this technique may include, for example, triethanolamine, monoethanolamine, diethanolaamine, diisopropanolamine, diglycolamine, and methyldiethanolamine. Another technique for separating $CO_2$ may be physical absorption. It may be noted that all or a combination of any of the techniques described above for $CO_2$ separation may be used to separate $CO_2$ advantageously.

The heat exchanger 40 in the $CO_2$ separation system 28 is typically a gas-gas heat exchanger handling two gaseous streams, namely the first expanded exhaust stream 38 and the $CO_2$ lean stream 46. The volume of the first expanded exhaust stream 38 is higher than the volume of the $CO_2$ lean stream 46 coming out of the $CO_2$ separator 44 as $CO_2$ is isolated from the first expanded exhaust stream 38 in the $CO_2$ separator 44. Therefore the amount of heat released from the first expanded exhaust stream 38 in the heat exchanger 40 may not be utilized fully in heating the $CO_2$ lean stream 46 and this excess heat may be utilized to regenerate the solvent in the $CO_2$ separator in case chemical adsorption process is used. In some embodiments, the $CO_2$ separation system may further include a water removal system to remove moisture from the first expanded exhaust 38 thereby further reducing the volume of the $CO_2$ lean stream 46. Therefore by including the water removal unit, the excess heat available for solvent regeneration is increased. Due to this effective utilization of the excess heat from the heat exchanger 40, the overall efficiency of the power generation system 10 is increased.

In some embodiments, during operation, the oxidant 24 is compressed to about 2 to about 10 bars in the first low pressure compressor 14 and cooled down in an first intercooler 17. The basic principle of intercooling within compression includes partly compressing the gas and then cooling it before the final compression to the desired pressure is carried out, for example in high-pressure compressor 16. In this way, the compression work is reduced and thus the power output of the cyclic process is increased. As the existing aeroderivative style gas turbines comprise intercoolers disposed in-between the compression stages, no further changes in the turbine design is required to incorporate the intercoolers into such systems. Similarly a second intercooler 104 is disposed between the second low-pressure compressor 68 and the second high-pressure compressor 70 to cool down the compressed second final exhaust 102.

The first turbine system 11 further includes a first heat recovery steam generator (hereinafter HRSG) 54. The First HRSG 54 is configured to use the heat content of the first final exhaust 52 from the first expander section 18 to generate a first portion of steam 56 and a cooled first final exhaust 60. At a high $CO_2$ separation rate in $CO_2$ separator 44, the cooled final exhaust 60 released to the atmosphere is substantially free of $CO_2$ as the $CO_2$ separation system 28 is configured to separate the $CO_2$ content of the hot flue gas 31 generated in the first combustion chamber 22. This first portion of steam 56 generated in the first HRSG 54 is subsequently used in a steam cycle as shown in FIG. 1. Similarly the second turbine system 62 typically includes a second heat recovery steam generator (hereinafter HRSG) 90. The second final exhaust stream 88 generated in the second turbine system 62 can be introduced into the second HRSG 90. In this embodiment, the second HRSG 90 is generally a closed loop HRSG wherein no stream is typically vented into the atmosphere. The heat content of the second final exhaust stream 88 may be recovered by a water stream 94 to produce a second portion of steam 92. The first portion of steam 56 generated in the first HRSG 54 and the second portion of the steam 92 generated in the second HRSG 90 may be used in a steam turbine (not shown)

to produce electrical energy. Instead of the HRSGs shown, other bottoming heat recovery methods can alternatively be applied.

In the various embodiments of the power generation systems described herein, the oxidant is ambient air. It is understood that the compressed oxidant from the first compressor section 12 may comprise any other suitable gas containing oxygen, such as for example, oxygen rich air, oxygen depleted air, and/or pure oxygen.

The first and second fuel streams 26 and 82 may include any suitable hydrocarbon gas or liquid, such as natural gas, methane, naphtha, butane, propane, syngas, diesel, kerosene, aviation fuel, coal derived fuel, bio-fuel, oxygenated hydrocarbon feedstock, and mixtures thereof, and so forth. In one embodiment, the fuel is primarily natural gas (NG) and, therefore, the first hot flue gas 31 from the first combustion chamber 22 and the second hot flue gas 73 from the second combustion chamber 72 may include water, carbon dioxide ($CO_2$), carbon monoxide (CO), nitrogen ($N_2$) unburned fuel, and other compounds.

The cooled second final exhaust stream 96 from the second HRSG 90 is generally introduced into an exhaust gas cooler or moisture separator 98 to separate the water formed in the combustion process in the second combustion chamber 72. The exhaust gas cooler 98 can be used to control the inlet conditions, in particular the temperature, of compressor 68. The exit stream 100 from the moisture separator 98 typically includes at least $CO_2$ and $N_2$. The exit stream 100 is generally compressed in the second compressor section 64 to generate a compressed stream 102. In operation, during the initial phase of operation after start-up, the concentration of $CO_2$ in the compressed stream 102 may not be substantial and hence the entire stream 102 may be recycled back to the second combustion chamber 72 as a recycle stream 71 along with the second portion of compressed oxidant 36. This recycling operation generally increases the $CO_2$ concentration in the compressed stream 102. When the $CO_2$ concentration in the compressed stream 102 reaches a desired level, a split stream 84 may be introduced into the first high-pressure compressor 16. A control valve configuration (not shown) may be employed to facilitate diversion and introduction of the split stream 84 to the first combustion chamber 22. For example, a control valve may be disposed on the conduit carrying the split stream, and the operation of the control valve tied to an on-line instrument or sensor that measures the concentration of $CO_2$ in the compressed stream 102. The $CO_2$ concentration in the first hot flue gas 31 exiting the first combustion chamber 22 is therefore maximized by increasing the concentration of $CO_2$ in the second turbine system by controlling the recycles stream 71 and the split stream 84.

In this exemplary embodiment as depicted in FIG. 1, substantial carbon dioxide isolation can be achieved. In case of large $CO_2$ separators 44, the first final exhaust 52, generated from the first combustion chamber 22 is substantially cleaned from carbon dioxide and the cooled first final exhaust stream 60 vented to atmosphere typically does release significantly reduced amounts of carbon dioxide compared to comparable technology without $CO_2$ capture. The carbon dioxide produced in the second combustion chamber 72 may be concentrated in the recycle stream 71. The $CO_2$ content in the split stream 84 along with the $CO_2$ generated in the first combustion chamber 22 is separated in the $CO_2$ separation system 28 and the $CO_2$ stream 110 may be sequestrated or sold in the merchant market depending on the demand for carbon dioxide. The $CO_2$ rich stream 110 generated in the $CO_2$ separation system may be compressed in a compressor 112 before being distributed for other use.

Figure 2:
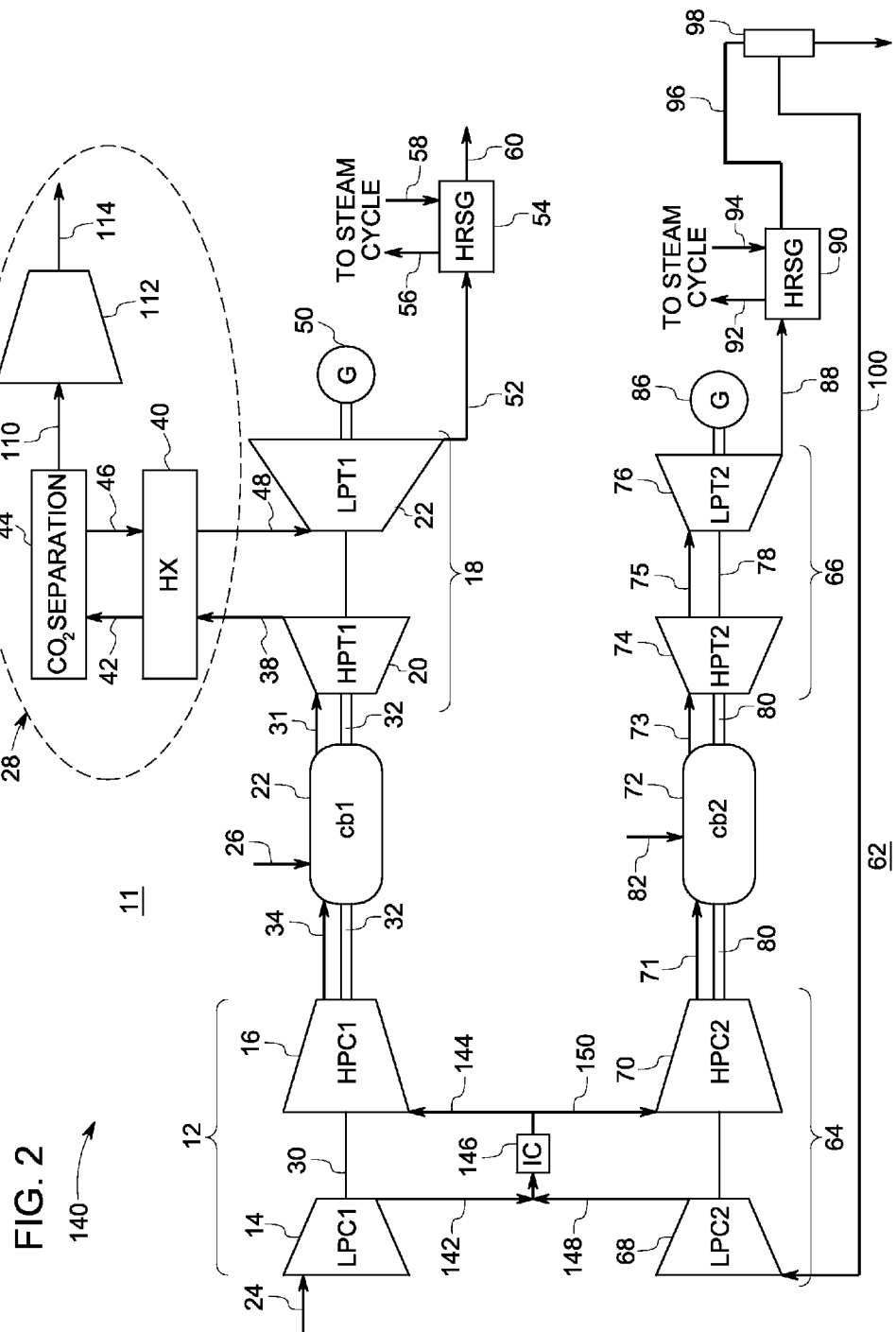
FIG. 2 is a schematic illustration of another exemplary power generation system comprising two turbine systems in accordance with certain embodiments of the present invention.

FIG. 2 illustrates another exemplary power generation system 140, wherein the two turbine systems are linked through a common intercooler in-between the compressor sections. The exemplary power generation system 140 includes a common intercooler 146 fluidly coupled to the first compressor section 12 and the second compression section 64. A stream of compressed oxidant 142 from the first low-pressure compressor 14 is mixed and introduced into the common intercooler 146 along with the split stream 148 from the second low-pressure compressor 68. The common intercooler 146 is configured to cool the compressed oxidant 142 and the split stream 148 and generate a first mixed stream 144 introduced into the first high pressure compressor 16 and a second mixed stream 150 introduced into the second high-pressure compressor 70. The first high-pressure compressor 16 generates a first compressed mixed stream 34 that is introduced into the first combustion chamber 22 and the second high pressure compressor 70 generates a second compressed mixed stream or the recycle stream 71 that is introduced into the second combustion chamber 72. In some embodiments, the heat released from the intercoolers may be used to drive the $CO_2$ separation process, for example amine stripping, or for another heat recovery cycle, for example an organic rankine cycle.

The power generation system described in the previous sections advantageously uses the positioning of the $CO_2$ separation system to effectively separate $CO_2$ generated in the combustion process. As shown in FIG. 1, $CO_2$ is removed after combustion, or more specifically, from the flue gas extracted at a pressure mid-way through the gas turbine expander. It is advantageous to remove the $CO_2$ from a pressurized flue gas as the driving forces for separation increase and equipment size and cost decrease. However, the higher the extraction pressure of the flue gas, the higher is its extraction temperature. Due to material constraints, it is advantageous to design the $CO_2$ separation system 28 at reduced temperatures of about 700 Deg. C. to about 1000 Deg. C. compared to the combustor exit, depending on the temperature of fluid 38. Although the pressure available in the hot flue gas stream 31 immediately after the combustion chamber 22 is higher than the pressure of the first expanded exhaust 38, the trade off for positioning the $CO_2$ separation system midway between the expansion path is the high temperature of about 1300 Deg C. of the hot flue gas 31. In aeroderivative style gas turbines, as shown in FIG. 1, multiple compression and expansion stages result in a high compression ratio. Therefore, since the pressure generated in the compressor section is substantially high, the pressure available in the midway between the expander section is sufficiently high to design a cost effective and efficient $CO_2$ separation system.

The power generation systems described in the previous sections also advantageously link the two turbine systems as shown in FIGS. 1-2. The gas turbines are linked through extracting the working fluids after the low-pressure compressors, preferably after being cooled in a common intercooler (FIG. 2) or separate intercoolers (FIG. 1). In the existing aeroderivative style gas turbines, the ports for the extraction and re-injection of the working fluids midway through the compression pathway already exist, which ports can be utilized to significantly reduce the modifications required to the turbines to incorporate the linking of the two turbine systems as shown in FIGS. 1-2. Linking the turbine systems at moderate pressures and low temperatures (available midway through the compression pathway) minimizes the efficiency losses and requirements for costly materials due to the moderate fluid temperatures.

As shown in FIG. 2, the mixing of the oxidant and the split stream prior to continued compression in the high-pressure compressors promotes a better mixing process. Therefore requirement of any additional mixing device is avoided, which mixing device is typically designed to promote a homogeneous composition and temperature of the working fluids and to minimize the impact of the fluid cross-over between the gas turbines on the compressor performance.

Figure 3:
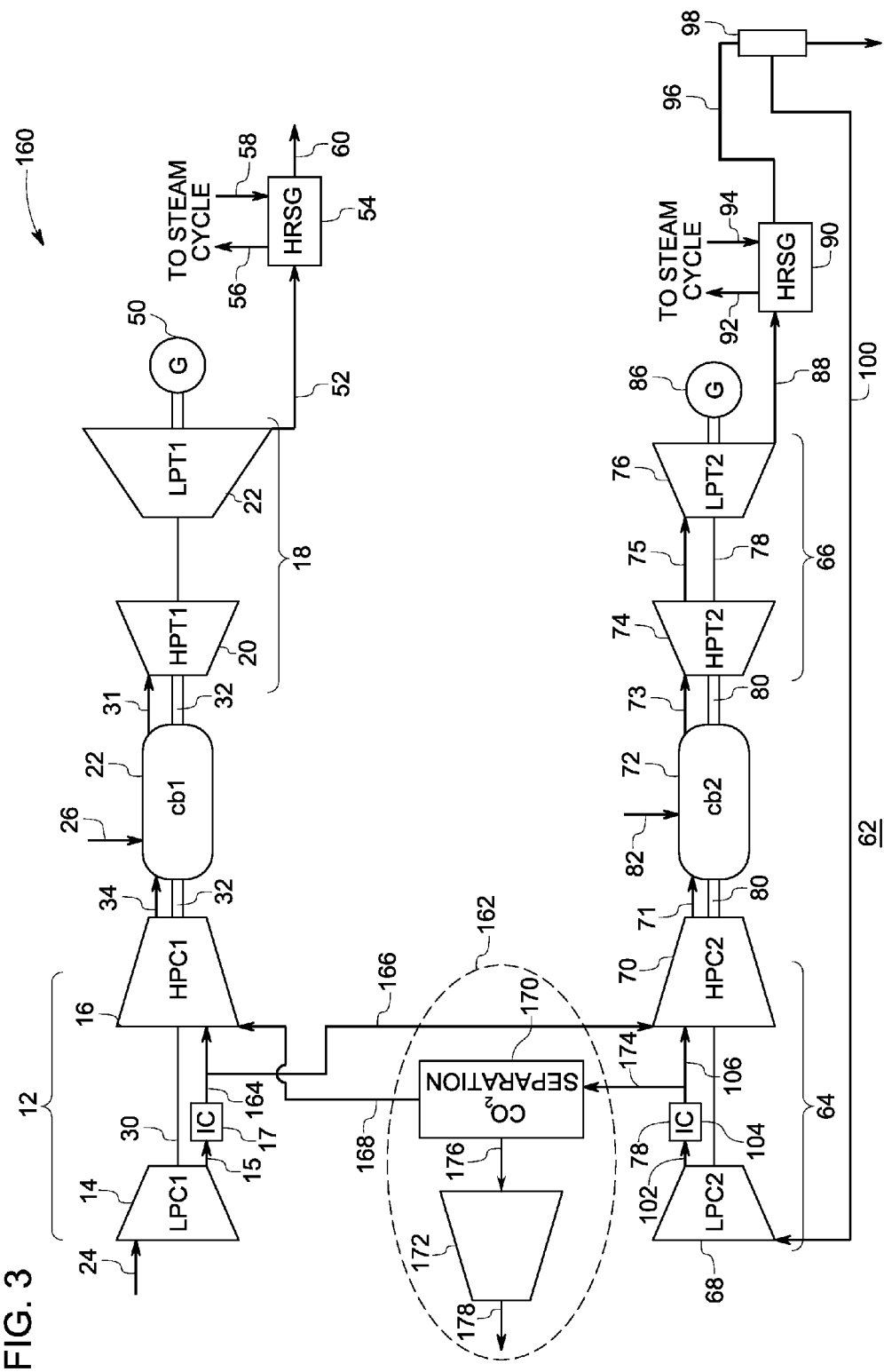
FIG. 3 is a schematic illustration of yet another power generation system comprising two turbine systems in accordance with certain embodiments of the present invention.

FIG. 3 illustrates yet another exemplary power generation system, wherein the $CO_2$ separation system is disposed midway between the compression stages of the first and second turbine systems. As shown in FIG. 3, the $CO_2$ separation system 162 is disposed in-between the first compressor section 12 and the second compressor section 64. The $CO_2$ separation system 162 is configured to receive the split stream 174 from the second intercooler 104 and generate a $CO_2$ lean stream 168 and a $CO_2$ rich stream 176. A first portion of oxidant 164 from the first intercooler 17 is mixed with the $CO_2$ lean stream 168 and is introduced into the first high-pressure compressor 16 to generate the first compressed mixed stream 34. A second portion of oxidant 166 from the first intercooler 17 is mixed with a second split stream 106 from the second intercooler 104 and introduced into the second high pressure compressor 70 to generate a second mixed compressed stream or recycle stream 71. Optionally, the intercoolers 17 and 104 can also be placed directly in front of the inlets of the corresponding high-pressure compressors 16 and 70.

The $CO_2$ separation system 162 includes a $CO_2$ separator 170 to generate the $CO_2$ rich stream 176 and the $CO_2$ lean stream 168. There are several advantages of separating $CO_2$ from the split stream 174. The pressure available at the exit of the low-pressure compressor 68 is adequate to design a cost effective and efficient $CO_2$ separator. The volume of the split stream 174 sent to the $CO_2$ separation system is relatively smaller. Therefore the capital cost for installing the $CO_2$ separation system 162 in the midway through the compressor sections requires less capital cost compared to the $CO_2$ separation systems shown in FIGS. 1-2. Furthermore, before mixing fresh oxidant Stream 164 with $CO_2$ rich second split stream 106, both streams can be advantageously cooled using the first intercooler 17 and the second intercooler 104 respectively. The heat rejected from the intercoolers can be used to boost the efficiency of heat recovery systems, for example steam production, or to drive the $CO_2$ separation process. The second intercooler 104 can also be used to cool the split stream 174 to the operating temperature of the $CO_2$ separator 44.

Figure 4:
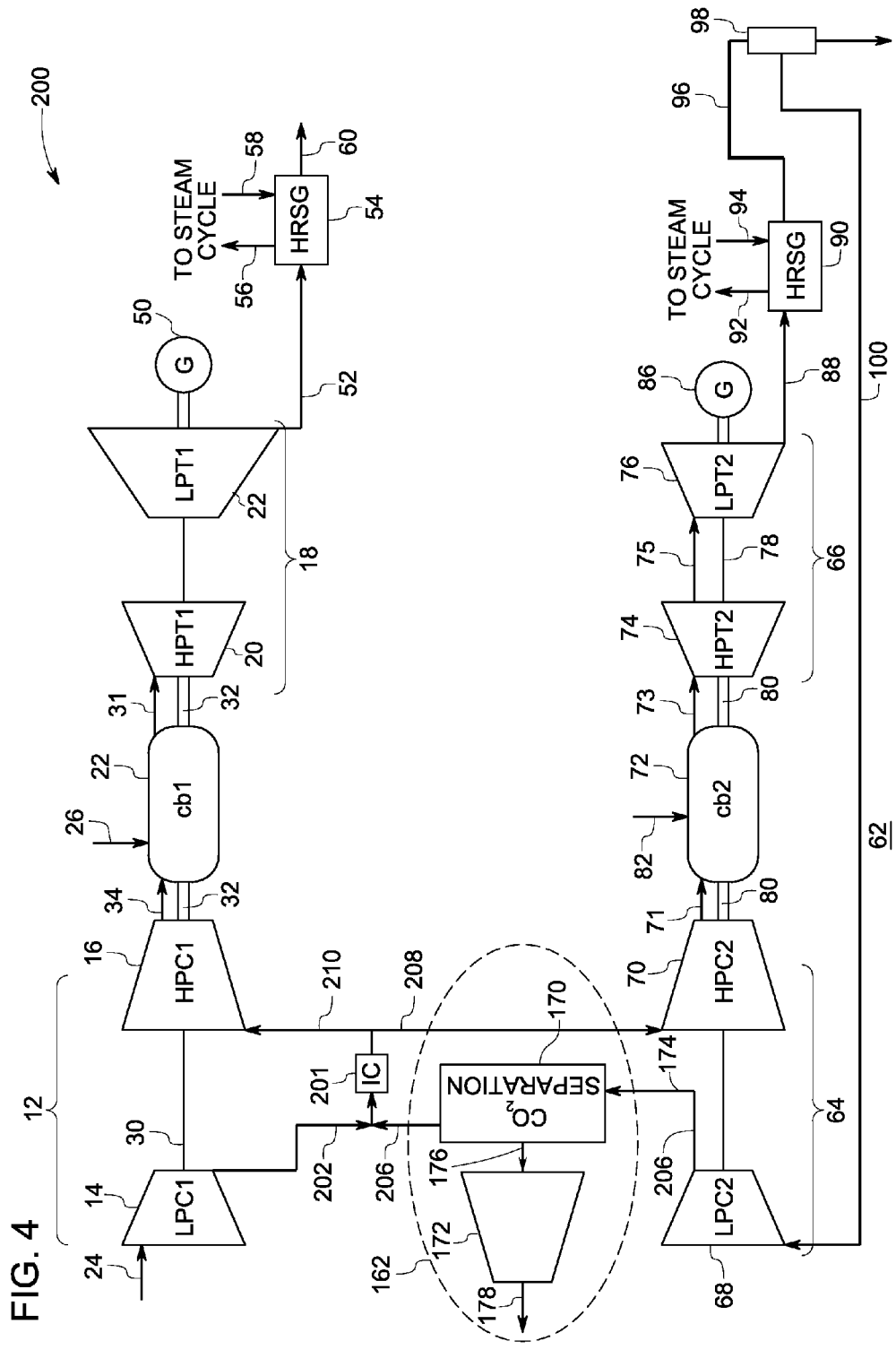
FIG. 4 is a schematic illustration of another power generation system comprising two turbine systems in accordance with certain embodiments of the present invention.

FIG. 4 illustrates another exemplary power generation system 200, wherein the $CO_2$ separation system is disposed midway between the compression stages of the first and second turbine systems. The exemplary power generation system 200 includes a common intercooler 201 disposed in between the $CO_2$ separation system 162 and the first compressor section 12. The $CO_2$ lean gas 206 from the $CO_2$ separation system 162 is mixed with the compressed oxidant stream 202 from the first low-pressure compressor 14 and is introduced into the common intercooler 201. The cooled mixed stream exiting the common intercooler 201 is split and a first mixed stream 210 is sent to the first high-pressure compressor 16 and the second mixed stream 208 is sent to the second high-pressure compressor 70. The use of a common intercooler reduces the cost of the power generation system 200.

All embodiments illustrated in FIGS. 1-4 may further include a reheat combustor (not shown), which reheat combustor is disposed between the second high pressure expender 74 and the second low-pressure expander 76. Reheat combustor helps in increasing the power output possible for a given compression ratio. The temperature of the second hot flue gas 73 decreases after going through expansion in the second high-pressure expander 74. As a portion of the second expanded gas 75 is sent to the reheat combustor, the temperature of the outlet stream from the reheat combustor is increased due to the combustion process in the reheat combustor. The hot outlet stream from the reheat combustor is introduced into the low pressure expander 76 for further expansion to generate electrical energy and due to this temperature increase in the outlet stream of reheat combustor, the overall power output is increased.

There are several advantages of the power generation cycles described in the previous sections. The $CO_2$ separation system is advantageously disposed in between the low and high-pressure expanders as shown in FIGS. 1-2. The first expanded exhaust from the high pressure expander typically is at a reduced temperature compared to the combustor exit, for example of about 700 Deg C. to about 1000 Deg C., but still at a pressure, which pressure is sufficient to provide a high separation efficiency of $CO_2$ in the $CO_2$ separator in case a membrane separator or a PSA is used. The size and the capital cost for installing the $CO_2$ separation system is also reduced as the first expanded exhaust is at a high pressure of at about 2 bar to about 30 bar and a reduced temperature compared to the combustor exit. The power generation system described herein is configured to achieve substantial isolation of $CO_2$ as the entire $CO_2$ generated from the combustion chambers is introduced into the $CO_2$ separation system. In the embodiments, wherein two turbine systems are included, the combustion products from the second turbine system is recycled in a closed loop as described above to build the optimum concentration level of $CO_2$ before being introduced to the first combustion chamber. So the exhaust that is released to the atmosphere from such power generation system is substantially free of $CO_2$.

The positioning of the $CO_2$ separation system midway through the compression pathway as shown in FIG. 3 reduces the capital cost of the $CO_2$ separation system as described earlier. The $CO_2$ separation system in this embodiment also advantageously uses the intercoolers to cool the split stream for efficient $CO_2$ separation thereby increasing the overall efficiency of the power cycle.

The power generation systems described above can use the existing designs of the aeroderivative style turbines for extraction and re-injection of the working fluid midway through the compression pathway. This significantly reduces the redesign efforts and cost for the turbine systems. The efficiency and the effectiveness of linking of two turbine systems increases due to linking of gas turbines at lower pressures and temperatures, which results in reduced material costs.

Typically the power generation cycles that integrate $CO_2$ separation and isolation show a substantial decrease (in the range of about 10%-points) in the overall cycle efficiency compared to a power cycle without $CO_2$ separation. But the power generation systems described above show a much smaller decrease in the over all cycle efficiency due to the following reasons: The positioning of the $CO_2$ separation system midway through the expansion section thereby increasing the separation efficiency of $CO_2$ by utilizing a substantial high pressure even at the exit of the high-pressure expander helps reducing the efficiency loss of using $CO_2$ capture within of the power cycle. Furthermore the use of a reheat combustor and utilizing the excess heat generated in the gas-gas exchanger in the $CO_2$ separation system further increases the efficiency of the cycle. Therefore the overall energy penalty associated with power generation systems with $CO_2$ separation described above is far less than the conventional power cycles with $CO_2$ capture.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A power generation system comprising:
a first turbine system comprising:
a first compressor section comprising at least two stages, said at least two stages comprising a first low pressure compressor fluidly coupled to a first high pressure compressor configured to supply a first portion of compressed oxidant and a second portion of compressed oxidant;
a first combustion chamber configured to combust said first portion of compressed oxidant and a first fuel stream comprising carbon-based fuels and to generate a first hot flue gas;
a first expander section having an inlet for receiving said first hot flue gas comprising at least two stages, said at least two stages comprising a first high pressure expander configured to generate a first expanded exhaust gas rich in $CO_2$, said first high pressure expander fluidly coupled to a first low pressure expander configured to generate a first exhaust and electrical energy; and
a $CO_2$ separation system fluidly coupled to the high pressure expander for receiving said first expanded exhaust gas from said first high pressure expander and provide a $CO_2$ lean gas that is then fed to said first low-pressure expander; and
a second turbine system comprising:
a second compressor section comprising at least two stages, said at least two stages comprising a second low pressure compressor fluidly coupled to a second high pressure compressor, wherein said high pressure compressor is configured to receive said second portion of compressed oxidant;
a second combustion chamber configured to combust a second fuel stream comprising carbon-based fuels and to generate a second hot flue gas; and
a second expander section configured to receive said second hot flue gas, and to generate a second final exhaust and electrical energy;
wherein said second compressor section is configured to receive said second final exhaust comprising carbon dioxide and to discharge a recycle stream from said second high pressure compressor to said second combustion chamber and a split stream from said second low pressure compressor to said first high pressure compressor.

2. The system of claim 1, wherein said $CO_2$ separation system comprises a heat exchanger configured to recover heat from said first expanded exhaust gas and generate a cooled first expanded exhaust gas and a carbon dioxide separator configured to receive said cooled carbon dioxide rich stream and generate a carbon dioxide lean stream.

3. The system of claim 2, wherein said heat exchanger comprises a cross-exchanger configured to recover heat from said first expanded exhaust gas in exchange with said carbon dioxide lean stream from said carbon dioxide separator.

4. The system of claim 2, wherein said carbon dioxide separator comprises a membrane unit.

5. The system of claim 1, wherein said first and second fuels comprise natural gas.

6. The system of claim 1, further comprising a first heat recovery steam generator configured to recover heat from said first final exhaust and generate a first portion of steam and a second heat recovery steam generator configured to recover heat from said second final exhaust and generate a second portion of steam.

7. The system of claim 1 further comprising at least one intercooler.

8. The system of claim 7, wherein said at least one intercooler comprises a common intercooler disposed in between said first compressor section and said second compressor section and is fluidly coupled to said first and second low pressure compressors and said first and second high pressure compressors.

9. The system of claim 7, wherein said at least one intercooler comprises a first intercooler disposed between said first low pressure compressor and first high pressure compressor and a second intercooler disposed between said second low pressure compressor and said second high pressure compressor.

10. The system in claim 9, wherein said split stream is taken out from the outlet of said second intercooler.

11. The system of claim 1, wherein said first final exhaust is substantially free of $CO_2$.

12. The system of claim 1, wherein said oxidant is air.

13. The system of claim 1, wherein said second expander section comprises at least two stages, said at least two stages comprising a second high pressure expander configured to generate a second expanded exhaust gas, said second high pressure expander fluidly coupled to a second low pressure expander configured to generate said second final exhaust and electrical energy.

14. A power generation system comprising:
a first turbine system comprising:
a first compressor section comprising at least two stages, said at least two stages comprising a first low pressure compressor fluidly coupled to a first high pressure compressor, said first low pressure compressor configured to supply a first portion of compressed oxidant and said high pressure compressor is configured to supply a first compressed mixed stream;
a first combustion chamber configured to combust a first fuel stream comprising carbon-based fuels and said first compressed mixed stream and to generate a first hot flue gas; and
a first expander section having an inlet for receiving said first hot flue gas comprising at least two stages, said at least two stages comprising a first high pressure expander, said first high pressure expander fluidly coupled to a first low pressure expander configured to generate a first final exhaust and electrical energy; and
a second turbine system comprising:
a second compressor section comprising at least two stages, said at least two stages comprising a second low pressure compressor fluidly coupled to a second high pressure compressor, wherein said low pressure compressor is configured to generate a split stream and said high pressure compressor is configured to generate a second mixed stream;
a second combustion chamber configured to combust said second mixed stream and a second fuel stream comprising carbon-based fuels and to generate a second hot flue gas; and a second expander section configured to receive said second hot flue gas and to generate a second final exhaust and electrical energy; and a $CO_2$ separation system fluidly coupled to said first and second compressor sections, said $CO_2$ separation system configured to receive said split stream and generate a $CO_2$ lean stream;

wherein said second compressor section is configured to receive said second final exhaust comprising carbon dioxide and to discharge said second mixed stream from said high pressure compressor to said second combustion chamber.

15. The system of claim 13, wherein said $CO_2$ separation system comprises a carbon dioxide separator configured to receive said split stream and generate said carbon dioxide lean stream.

16. The system of claim 15, wherein the carbon dioxide separator comprises a membrane unit.

17. The system of claim 15, wherein said first and second fuels comprise natural gas.

18. The system of claim 15 further comprising a first intercooler disposed between said first low pressure compressor and first high pressure compressor and a second intercooler disposed between said second low pressure compressor and said second high pressure compressor.

19. The system in claim 18, wherein said split stream is taken out from the outlet of said second intercooler.

20. The system of claim 15, wherein said first final exhaust is substantially free of $CO_2$.

21. The system of claim 15, wherein said oxidant is air.

22. A method for generating power comprising:

compressing an oxidant in a compressor section to produce a first portion and a second portion of compressed oxidant;

combusting a first fuel and said first portion of compressed oxidant to produce a hot flue gas;

expanding said hot flue gas in an expander section and generating electrical energy wherein said expander section is configured to receive said hot flue gas comprising at least two stages, the at least two stages comprising a high pressure expander configured to generate a first expanded exhaust gas rich in $CO_2$, said high pressure expander fluidly coupled to a low pressure expander configured to generate a first final exhaust and said electrical energy;

separating $CO_2$ from said first expanded exhaust gas in a $CO_2$ separator and introducing a $CO_2$ lean gas to said low pressure expander;

compressing said second portion of compressed oxidant in a compressor section comprising at least two stages, said at least two stages comprising a second low pressure compressor fluidly coupled to a second high pressure compressor, wherein said high pressure compressor is configured to receive said second portion of compressed oxidant;

combusting a second fuel stream and a recycle stream comprising carbon-based fuels and generating a second hot flue gas; and expanding said second hot flue gas and generating a second final exhaust and electrical energy;

wherein said second compressor section is configured to receive said second final exhaust comprising carbon dioxide and to discharge said recycle stream from said second high pressure compressor and a split stream from said second low pressure compressor to said first high pressure compressor.

* * * * *